(12) United States Patent
Kawashima et al.

(10) Patent No.: US 11,455,645 B2
(45) Date of Patent: Sep. 27, 2022

(54) PROSPECTIVE BATTERY ELECTRIC VEHICLE (BEV) BUYER ANALYSIS

(71) Applicant: Honda Motor Co., Ltd., Tokyo (JP)

(72) Inventors: Kiyotaka Kawashima, Los Angeles, CA (US); Hidehiro Tsubokura, Redondo Beach, CA (US); Ting Zhang, Zhejiang (CN)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 16/677,111

(22) Filed: Nov. 7, 2019

(65) Prior Publication Data

US 2020/0394667 A1    Dec. 17, 2020

Related U.S. Application Data

(60) Provisional application No. 62/861,098, filed on Jun. 13, 2019.

(51) Int. Cl.
| | | |
|---|---|---|
| G06Q 30/02 | (2012.01) | |
| G06N 20/20 | (2019.01) | |
| G06N 5/00  | (2006.01) | |

(52) U.S. Cl.
CPC ......... G06Q 30/0204 (2013.01); G06N 5/003 (2013.01); G06N 20/20 (2019.01); G06Q 30/0202 (2013.01)

(58) Field of Classification Search
None
See application file for complete search history.

(56) References Cited

U.S. PATENT DOCUMENTS

| | | | |
|---|---|---|---|
| 10,740,404 B1* | 8/2020 | Hjermstad | G06F 16/909 |
| 2013/0124441 A1* | 5/2013 | Quaile | G06N 5/043 |
| | | | 706/46 |
| 2019/0205905 A1* | 7/2019 | Raghunathan | G06N 3/0454 |

(Continued)

OTHER PUBLICATIONS

Guo, F., Yang, J. and Lu, J., 2018. The battery charging station location problem: Impact of users' range anxiety and distance convenience. Transportation Research Part E: Logistics and Transportation Review, 114, pp. 1-18 (Year: 2018).*

(Continued)

*Primary Examiner* — Patricia H Munson
*Assistant Examiner* — Marjorie Pujols-Cruz
(74) *Attorney, Agent, or Firm* — Rankin, Hill & Clark LLP (57) ABSTRACT

A method for identifying prospective purchasers of battery electric vehicles (BEVs) may include defining a predetermined time frame associated with vehicle ownership, receiving a first dataset including a first subset of drivers are drivers who have owned or leased any first internal combustion engine (ICE) vehicle followed by any second ICE vehicle within the predetermined time frame, a second subset of drivers are drivers who have owned or leased any first ICE vehicle followed by any second BEV within the predetermined time frame, and a third subset of drivers are drivers who have not changed vehicles within the predetermined time frame, receiving a second dataset including a set of drivers who own or lease any first ICE vehicle which is in a same vehicle class as a target BEV, and identifying a target set of prospective purchasers of BEVs.

19 Claims, 5 Drawing Sheets

(56) References Cited

U.S. PATENT DOCUMENTS

2019/0294642 A1* 9/2019 Matlick ................. G06F 16/958
2019/0311396 A1* 10/2019 Wood ................. G06Q 30/0245
2020/0126126 A1* 4/2020 Briancon ............. G06K 9/6259

OTHER PUBLICATIONS

Sun L, Huang Y, Liu S, Chen Y, Yao L, Kashyap A. completive survey study on the feasibility and adaptation of EVs in Beijing, China. Applied Energy. Feb. 1, 2017; 187:128-39 (Year: 2017).*
De Rubens, G. Z. (2019). Who will buy electric vehicles after early adopters? Using machine learning to identify the electric vehicle mainstream market. Energy, 172, 243-254 (Year: 2019).*

* cited by examiner

PROSPECTIVE BATTERY ELECTRIC VEHICLE (BEV) BUYER ANALYSIS

BACKGROUND

Internal combustion engines (ICEs), often found in gasoline or diesel powered engines may have associated drawbacks. For example, the variety of fuels that can be used to power these ICE is limited to processed quality gaseous and liquid fuel. Often, the fuel used is very costly. Additionally, engine emissions may be generally high compared to other types of engines. ICEs are also associated with louder noises generated due to detonation of fuel.

BRIEF DESCRIPTION

According to one aspect, a computer-implemented method for identifying prospective purchasers of battery electric vehicles (BEVs) may include defining a predetermined time frame associated with vehicle ownership, receiving a first dataset, the first dataset including a first subset of drivers, a second subset of drivers, and a third subset of drivers, wherein the first subset of drivers are drivers who have owned or leased any first internal combustion engine (ICE) vehicle followed by any second ICE vehicle within the predetermined time frame, wherein the second subset of drivers are drivers who have owned or leased any first ICE vehicle followed by any second BEV within the predetermined time frame, and wherein the third subset of drivers are drivers who have not changed vehicles within the predetermined time frame, identifying a first set of prospective purchasers of BEVs from the third subset of drivers of the first dataset based on a first set of driving factors, receiving a second dataset, the second dataset including a set of drivers who own or lease any first ICE vehicle which is in a same vehicle class as a target BEV, identifying a second set of prospective purchasers of BEVs from the second dataset based on a second set of driving factors, and identifying a target set of prospective purchasers of BEVs based on the first set of prospective purchasers of BEVs and the second set of prospective purchasers of BEVs.

Identifying the target set of prospective purchasers of BEVs may be based on an intersection of the first set of prospective purchasers of BEVs and the second set of prospective purchasers of BEVs. The first set of driving factors may include electronic customer relationship management (eCRM) information. The first set of driving factors may include trip behavior data. The first set of driving factors includes one or more of a user's proximity to a charging station, a user's typical navigation path's proximity to a charging station, an average travel velocity, an average mileage per day or per trip, a dwell time, a number of trips per month, a daily average mileage, a number of routine trips, a trip mileage score, a number of drives per day, a non-routine trip mileage, an average daily duration or time for driving, a number of non-routine weekday trips, a routine mileage score, a number of non-routine weekend trips, a number of non-routine trips, a routine trip mileage, a number of routine weekend trips, or a number of trips. The user's proximity to the charging station and the user's typical navigation path's proximity to the charging station may be weighted more than one or more of the other driving factors from the first set of driving factors.

The computer-implemented method for identifying prospective purchasers of BEVs may include building a first model based on the first dataset or building a second model based on the second dataset or tuning the first model or the second model based on random decision forests. The vehicle class may be mid-size or compact. Identifying the target set of prospective purchasers of BEVs may be based on evaluation of a first model associated with the first dataset or evaluation of a second model associated with the second dataset using a confusion matrix.

According to one aspect, a computer-implemented method for identifying prospective purchasers of battery electric vehicles (BEVs) may include defining a predetermined time frame associated with vehicle ownership, receiving a first dataset, the first dataset including a first subset of drivers, a second subset of drivers, and a third subset of drivers, wherein the first subset of drivers are drivers who have owned or leased any first internal combustion engine (ICE) vehicle followed by any second ICE vehicle within the predetermined time frame, wherein the second subset of drivers are drivers who have owned or leased any first ICE vehicle followed by any second BEV within the predetermined time frame, and wherein the third subset of drivers are drivers who have not changed vehicles within the predetermined time frame, identifying a first set of prospective purchasers of BEVs from the third subset of drivers of the first dataset based on a first set of driving factors, receiving a second dataset, the second dataset including a set of drivers who own or lease any first ICE vehicle which is in a same vehicle class as a target BEV, identifying a second set of prospective purchasers of BEVs from the second dataset based on a second set of driving factors, identifying a target set of prospective purchasers of BEVs based on the first set of prospective purchasers of BEVs and the second set of prospective purchasers of BEVs, and notifying one or more of the target set of prospective purchasers of BEVs of an incentive to purchase the target BEV.

The identifying the target set of prospective purchasers of BEVs may be based on an intersection of the first set of prospective purchasers of BEVs and the second set of prospective purchasers of BEVs. The first set of driving factors may include electronic customer relationship management (eCRM) information. The first set of driving factors may include trip behavior data. The first set of driving factors may include one or more of a user's proximity to a charging station, a user's typical navigation path's proximity to a charging station, an average travel velocity, an average mileage per day or per trip, a dwell time, a number of trips per month, a daily average mileage, a number of routine trips, a trip mileage score, a number of drives per day, a non-routine trip mileage, an average daily duration or time for driving, a number of non-routine weekday trips, a routine mileage score, a number of non-routine weekend trips, a number of non-routine trips, a routine trip mileage, a number of routine weekend trips, or a number of trips. The user's proximity to the charging station and the user's typical navigation path's proximity to the charging station may be weighted more than one or more of the other driving factors from the first set of driving factors.

According to one aspect, a non-transitory computer readable storage medium may store instructions that when executed by a computer including a processor, perform a method. The method may include defining a predetermined time frame associated with vehicle ownership, receiving a first dataset, the first dataset including a first subset of drivers, a second subset of drivers, and a third subset of drivers, wherein the first subset of drivers are drivers who have owned or leased any first internal combustion engine (ICE) vehicle followed by any second ICE vehicle within the predetermined time frame, wherein the second subset of drivers are drivers who have owned or leased any first ICE vehicle followed by any second battery electric vehicle (BEV) within the predetermined time frame, and wherein the third subset of drivers are drivers who have not changed vehicles within the predetermined time frame, identifying a first set of prospective purchasers of BEVs from the third subset of drivers of the first dataset based on a first set of driving factors, receiving a second dataset, the second dataset including a set of drivers who own or lease any first ICE vehicle which is in a same vehicle class as a target BEV, identifying a second set of prospective purchasers of BEVs from the second dataset based on a second set of driving factors, identifying a target set of prospective purchasers of BEVs based on the first set of prospective purchasers of BEVs and the second set of prospective purchasers of BEVs, and notifying one or more of the target set of prospective purchasers of BEVs of an incentive to purchase the target BEV.

Identifying the target set of prospective purchasers of BEVs may be based on an intersection of the first set of prospective purchasers of BEVs and the second set of prospective purchasers of BEVs. The first set of driving factors may include one or more of a user's proximity to a charging station, a user's typical navigation path's proximity to a charging station, an average travel velocity, an average mileage per day or per trip, a dwell time, a number of trips per month, a daily average mileage, a number of routine trips, a trip mileage score, a number of drives per day, a non-routine trip mileage, an average daily duration or time for driving, a number of non-routine weekday trips, a routine mileage score, a number of non-routine weekend trips, a number of non-routine trips, a routine trip mileage, a number of routine weekend trips, or a number of trips. The user's proximity to the charging station and the user's typical navigation path's proximity to the charging station may be weighted more than one or more of the other driving factors from the first set of driving factors.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing.

Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Figure 1:
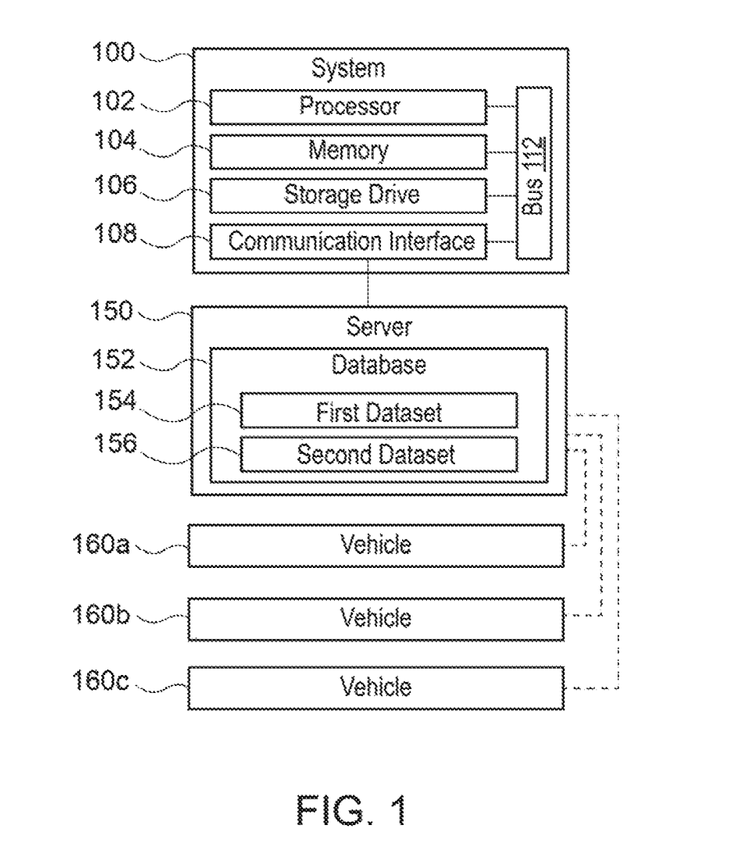
FIG. 1 is an exemplary component diagram of a system for prospective battery electric vehicle (BEV) buyer analysis, according to one aspect.

FIG. 1 is an exemplary component diagram of a system 100 for prospective battery electric vehicle (BEV) buyer analysis, according to one aspect. The system 100 may include a processor 102, a memory 104, a storage drive 106, a communication interface 108, and a bus 112, which may enable computer communication between components of the system 100. The system 100 of FIG. 1 may be implemented as a non-transitory computer readable storage medium, according to one aspect. According to another aspect, the system 100 of FIG. 1 may be configured to perform one or more acts of a computer implemented method. The communication interface 108 may be communicatively coupled to a server 150 and enable the system 100 to receive data, such as a first dataset 154 and a second dataset 156, from the server 150. The server 150 may include a database 152. The database 152 may include the first dataset 154 and the second dataset 156. According to one aspect, the first dataset 154 may be indicative of a first subset of drivers, a second subset of drivers, and a third subset of drivers. The server 150 may build a first model based on the first dataset 154 and build a second model based on the second dataset 156. According to other aspects, the processor 102 may build the first model based on the first dataset 154 and build the second model based on the second dataset 156. Data from the first dataset 154 or second dataset 156 may be sampled and adjusted for sample imbalance (e.g., via up sampling). Tuning may be performed (e.g., by the server 150 or by the processor 102) based on random decision forests. The first model and/or the second model may be evaluated.

The first subset of drivers of the first dataset 154 may be drivers who have owned or leased any first internal combustion engine (ICE) vehicle followed by any second ICE vehicle within a predetermined time frame. Briefly, with reference to FIG. 3, the first subset of drivers of the first dataset 154 may be the set of drivers represented by 'User A', for example. The predetermined time frame may be a time frame associated with vehicle ownership or vehicle usage (e.g., a vehicle leased by the user). The predetermined time frame may be an arbitrary time frame associated with a threshold percentage of the population changing vehicles. For example, the predetermined time frame may be seventy-one months or around six years. As another example, with reference to leased vehicles, the predetermined time frame may be three, four, or five years. In any event, the processor 102 of the computer-implemented method for identifying prospective purchasers of BEVs or the processor 102 associated with the non-transitory computer readable storage medium storing instructions that when executed by a computer, perform a method, may define the predetermined time frame associated with vehicle ownership or vehicle usage.

As described herein, the processor 102 may be described with reference to the computer-implemented method, the non-transitory computer readable storage medium, and/or the system 100 of FIG. 1. The processor 102 may receive the first dataset 154. The first dataset 154 may include the first subset of drivers, the second subset of drivers, and the third subset of drivers, as described above. The analysis performed, including, but not limited to the receiving the datasets, the identifying the first and second sets of prospective purchasers of BEVs, and the identifying the target set of prospective purchasers of BEVs may be performed or implemented on a computer system or using software. For example, the processor 102 may execute one or more steps of the method, which may be stored on the memory 104 or the storage drive 106.

The first subset of drivers may be drivers who have owned or leased any first ICE vehicle followed by any second ICE vehicle within the predetermined time frame. In other words, the first subset of drivers includes information about people who stayed with internal combustion engine or ICE vehicles, and may be thus indicative of people who may not necessarily be interested in switching to a BEV.

The second subset of drivers may be drivers who have owned or leased any first ICE vehicle followed by any second BEV within the predetermined time frame. In other words, second subset of drivers includes information about people who changed from an internal combustion engine vehicle to a BEV, and may be thus indicative of people who may be interested in switching to the BEV. Briefly, with reference to FIG. 3, the second subset of drivers of the first dataset 154 may be the set of drivers represented by 'User B', for example.

Figure 3:
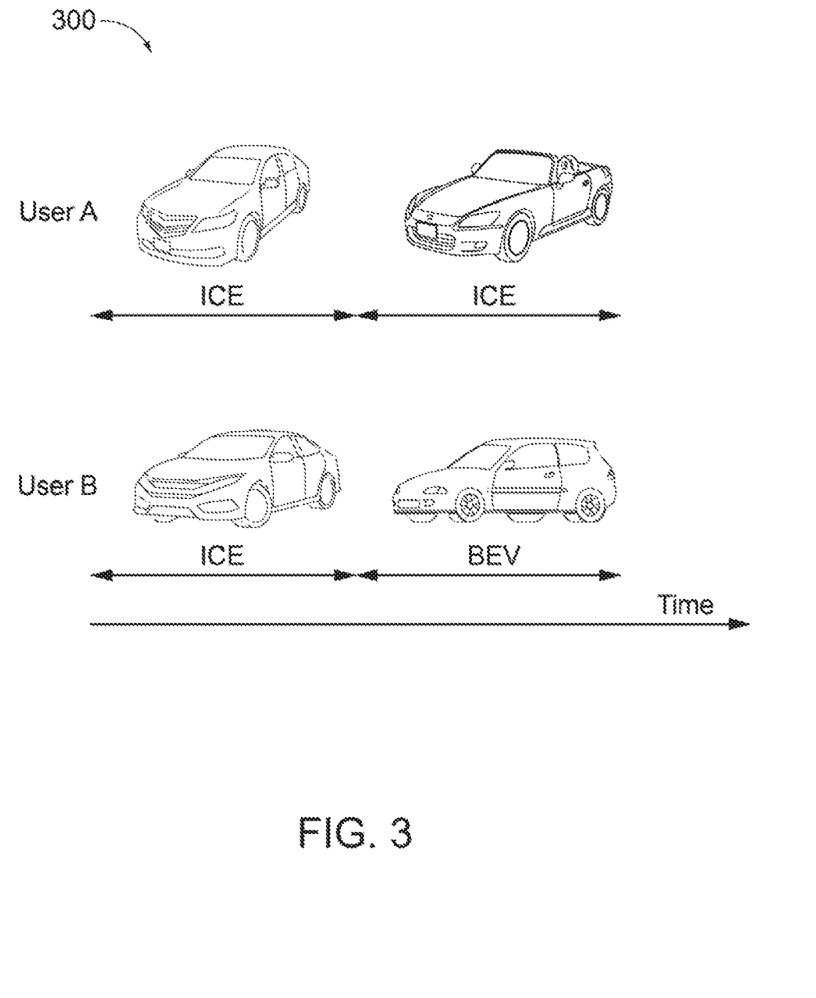
FIG. 3 is an exemplary diagram associated with systems and methods for prospective battery electric vehicle (BEV) buyer analysis, according to one aspect.

The third subset of drivers may be drivers who have not changed vehicles within the predetermined time frame (not shown in FIG. 3, but may be represented as 'User C'). Because drivers or user typically change vehicles at some point, the third subset of drivers may be drivers of interest in that an accurate prediction that a driver from the third subset of drivers that the driver will switch from the first ICE vehicle to the BEV may enable sales or marketing to provide the predicted driver with advertisements, incentives, etc. to switch. In this way, the processor 102 may identify a first set of prospective purchasers of BEVs from the third subset of drivers of the first dataset 154 based on a first set of driving factors, as will be described in greater detail herein.

The processor 102 may receive the second dataset 156 from the server 150. The second dataset 156 may include a set of drivers who own or lease any first ICE vehicle which is in a same vehicle class as a target BEV. In other words, the second dataset 156 may be indicative of drivers who are driving electric class vehicles equivalents of internal combustion engine vehicles. For example, the second dataset 156 may include a user or driver driving, owning, operating, or leasing a mid-size ICE vehicle (e.g., represented as 'User D') when the target BEV is of the mid-size class (e.g., represented as 'User E'). In this way, the second dataset 156 may include data associated with ICE vehicle user and data associated with BEV users and be utilized to facilitate determination of a second set of prospective purchasers of BEVs, as will be described herein. Examples of vehicle classes may include micro-cars, mini-compact, sub-compact, compact, mid-size, full-size, full-size luxury, SUV, etc. In other words, the target BEV may be the BEV which is being promoted, marketed, etc. However, in the interest of providing relevant information, a target set of prospective purchasers of BEVs may be identified by the processor 102. Regardless, the second dataset 156 may be utilized to identify possible or prospective BEV purchasers associated with the target BEV.

The processor 102 may identify a second set of prospective purchasers of BEVs from the second dataset 156 based on a second set of driving factors, as will be described in greater detail herein. Thereafter, the processor 102 may identify the target set of prospective purchasers of BEVs based on the first set of prospective purchasers of BEVs and the second set of prospective purchasers of BEVs. This may be achieved via identifying the target set of prospective purchasers of BEVs based on an intersection of the first set of prospective purchasers of BEVs and the second set of prospective purchasers of BEVs. Additionally, the processor 102 may identify the target set of prospective purchasers of BEVs based on evaluation of the first model associated with the first dataset 154 and/or evaluation of the second model associated with the second dataset 156 using a confusion matrix. According to one aspect, the first dataset does not include actual BEV user data. The first model may be a machine-learning (ML) model tuned in a first, model tuning stage using a first portion of the first dataset as a first training set. The tuned first model may be evaluated in a second, model evaluation stage using a second portion of the first dataset as a second training set. The first set of prospective purchasers may be identified based on the tuned, evaluated first ML model. A second, ML model may be tuned in a first, model tuning stage using a first portion of the second dataset as a first training set. The tuned second model may be evaluated in a second, model evaluation stage using a confusion matrix as a second training set. The confusion matrix may be of actual versus predicted first ICE vehicle versus target BEV. The second set of prospective purchasers may be identified based on using a second portion of the second dataset as test data as input data for the tuned, evaluated second model.

Examples of driving factors may include one or more of electronic customer relationship management (eCRM) information, trip behavior data, a user's proximity to a charging station, a user's typical navigation path's proximity to a charging station, an average travel velocity, an average mileage per day or per trip, a dwell time (e.g., which may be downtown that the user's vehicle is not being driven), a number of trips per month, a daily average mileage, a number of routine trips, a trip mileage score, a number of drives per day, a non-routine trip mileage, an average daily duration or time for driving, a number of non-routine weekday trips, a routine mileage score, a number of non-routine weekend trips, a number of non-routine trips, a routine trip mileage (e.g., routine may be defined based on trip start times or trips taken within a predefined time window), a commute score (e.g., commute score=number of trip count*/number of trips), a congestion score (e.g., congestion score=number of trip count*/number of trips), a number of routine weekend trips, or a number of trips, etc. According to one aspect, number of trip count* may be trips associated with potential traffic congestion. Therefore, the amount of potential traffic congestion may be utilized to compute one or more of the scores, which may thereby impact identification of the target set of prospective purchasers of BEVs based on the first set of prospective purchasers of BEVs and the second set of prospective purchasers of BEVs. Other examples of driving factors may include a charging station score=# of trip with nearby (within threshold distance of route) charging stations/total # of trips, a dwell time score=# of trips with X<10 miles per hour charge/total # of trips, a trip mileage score=# of trips with mileage<=mileage threshold associated with battery range/total # of trips, a routine mileage score=mileage to routine destinations/total mileage, etc.

According to one aspect, the user's proximity to the charging station and the user's typical navigation path's proximity to the charging station may be weighted more than one or more of the other driving factors from the first set of driving factors. According to one aspect, an overall score may be calculated where one or more of the above described driving factors may be associated with a corresponding weight.

| Example driving factor table |  |
|---|---|
| Features |  |
| X1 | routine_mileage |
| X2 | non_routine_mileage |
| X3 | num_r_trip |
| X4 | num_nr_trip |
| X5 | num_not_high_mileage_trip |
| X6 | dwell_time_score |
| X7 | trip_mileage_score |
| X8 | routine_mileage_score |
| X9 | num_trips |
| X10 | avg_mileage |
| X11 | avg_speed |
| X12 | avg_daily_duration |
| X13 | avg_daily_mileage |
| X14 | drive_day |
| X15 | drive_month |
| X16 | num_r_wn |
| X17 | num_r_wd |
| X18 | num_nr_wn |
| X19 | num_nr_wd |
| X20 | charge_station_score |
| X21 | commuting_score |
| X22 | congestion_score | r = routine
nr = non-routine
wn = weekend
wd = weekday
avg = average
num = number of According to one aspect, a first vehicle 160a, a second vehicle 160b, a third vehicle 160c, etc., may be utilized to collect the information associated with the first dataset 154 or the second dataset 156. In other words, vehicle data or information associated with these vehicles may be utilized to compile or build the first dataset 154 or the second dataset 156. According to one aspect, information, such as the first dataset 154 and the second dataset 156 may be received directly from different vehicles, without the use of the server 150 and the database 152 therein.

Figure 2:
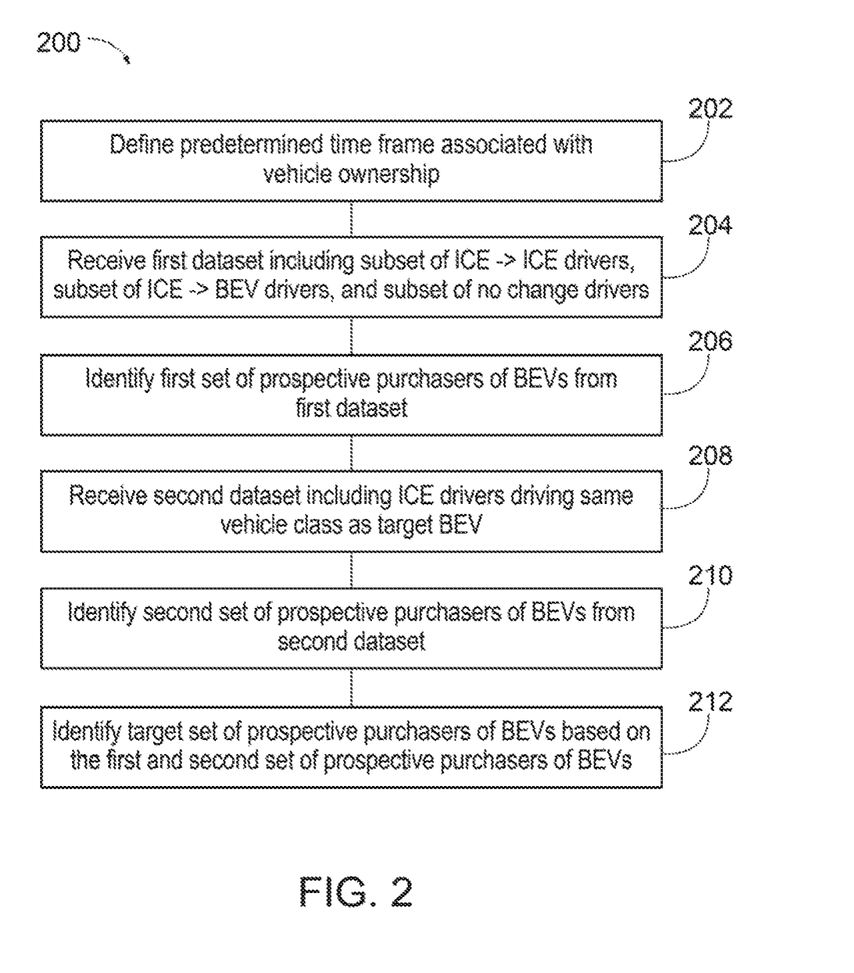
FIG. 2 is an exemplary flow diagram of a method for prospective battery electric vehicle (BEV) buyer analysis, according to one aspect.

FIG. 2 is an exemplary flow diagram of a method 200 for prospective battery electric vehicle (BEV) buyer analysis, according to one aspect. The method 200 for identifying prospective purchasers of battery electric vehicles (BEVs) may include defining 202 a predetermined time frame associated with vehicle ownership, receiving 204 the first dataset 154, the first dataset 154 including a first subset of drivers, a second subset of drivers, and a third subset of drivers, wherein the first subset of drivers are drivers who have owned or leased any first internal combustion engine (ICE) vehicle followed by any second ICE vehicle within the predetermined time frame, wherein the second subset of drivers are drivers who have owned or leased any first ICE vehicle followed by any second BEV within the predetermined time frame, and wherein the third subset of drivers are drivers who have not changed vehicles within the predetermined time frame, identifying 206 a first set of prospective purchasers of BEVs from the third subset of drivers of the first dataset 154 based on a first set of driving factors, receiving 208 the second dataset 156, the second dataset 156 including a set of drivers who own or lease any first ICE vehicle which is in a same vehicle class as a target BEV, identifying 210 a second set of prospective purchasers of BEVs from the second dataset 156 based on a second set of driving factors, and identifying 212 a target set of prospective purchasers of BEVs based on the first set of prospective purchasers of BEVs and the second set of prospective purchasers of BEVs.

FIG. 3 is an exemplary diagram 300 associated with systems and methods for prospective battery electric vehicle (BEV) buyer analysis, according to one aspect. The dataset associated with FIG. 3 may be the dataset including the first subset of drivers who have owned or leased any first internal combustion engine (ICE) vehicle followed by any second ICE vehicle within the predetermined time frame and the second subset of drivers who have owned or leased any first ICE vehicle followed by any second BEV within the predetermined time frame.

Figure 4:
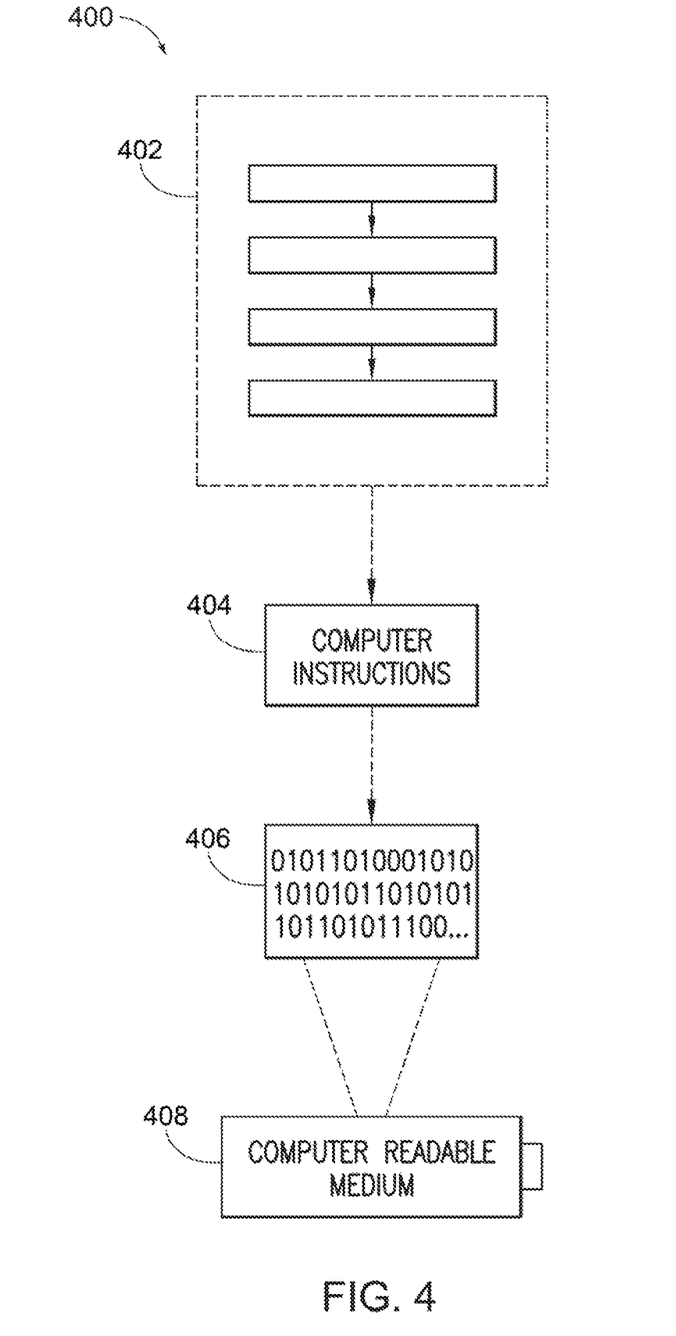
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the method 200 of FIG. 2. In another aspect, the processor-executable computer instructions 404 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
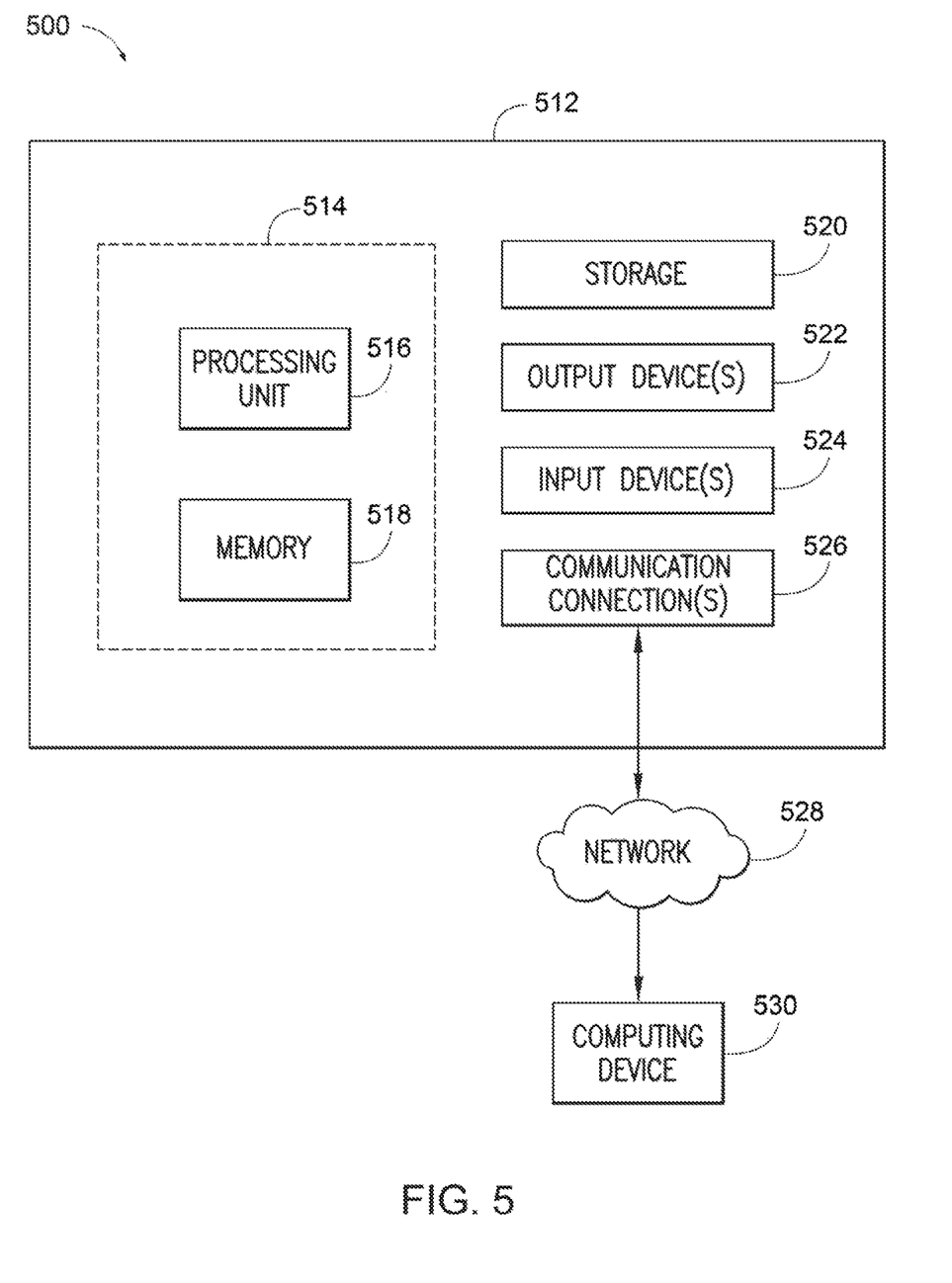
FIG. 5 is an illustration of an example computing environment where one or more of the provisions set forth herein are implemented, according to one aspect.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, handheld or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including a computing device 512 configured to implement one aspect provided herein. In one configuration, the computing device 512 includes at least one processing unit 516 and memory 518. Depending on the exact configuration and type of computing device, memory 518 may be volatile, such as RAM, non-volatile, such as ROM, flash memory, etc., or a combination of the two. This configuration is illustrated in FIG. 5 by dashed line 514.

In other aspects, the computing device 512 includes additional features or functionality. For example, the computing device 512 may include additional storage such as removable storage or non-removable storage, including, but not limited to, magnetic storage, optical storage, etc. Such additional storage is illustrated in FIG. 5 by storage 520. In one aspect, computer readable instructions to implement one aspect provided herein are in storage 520. Storage 520 may store other computer readable instructions to implement an operating system, an application program, etc. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 512. Any such computer storage media is part of the computing device 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 512 includes input device(s) 524 such as keyboard, mouse, pen, voice input device, touch input device, infrared cameras, video input devices, or any other input device. Output device(s) 522 such as one or more displays, speakers, printers, or any other output device may be included with the computing device 512. Input device(s) 524 and output device(s) 522 may be connected to the computing device 512 via a wired connection, wireless connection, or any combination thereof. In one aspect, an input device or an output device from another computing device may be used as input device(s) 524 or output device(s) 522 for the computing device 512. The computing device 512 may include communication connection(s) 526 to facilitate communications with one or more other devices 530, such as through network 528, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for identifying prospective purchasers of battery electric vehicles (BEVs), comprising:
    defining a predetermined time frame associated with vehicle ownership;
    receiving a first dataset including a first set of driving factors, the first dataset including a first subset of drivers, a second subset of drivers, and a third subset of drivers, wherein the first dataset does not include actual BEV user data, wherein the first subset of drivers are drivers who have owned or leased any first internal combustion engine (ICE) vehicle followed by any second ICE vehicle within the predetermined time frame, wherein the second subset of drivers are drivers who have owned or leased any first ICE vehicle followed by any second BEV within the predetermined time frame, and wherein the third subset of drivers are drivers who have not changed vehicles within the predetermined time frame;
    training a first machine-learning (ML) model using the first subset of drivers and the second subset of drivers with their respective driving factors, wherein a first portion of the subset of drivers is used as a first training set and a second portion of the subset of drivers is used a first testing set;
    identifying, using the first trained ML model, a first set of prospective purchasers of BEVs from the third subset of drivers of the first dataset based on the first set of driving factors including a user's proximity to a charging station;
    receiving a second dataset including a second set of driving factors, the second dataset including a set of drivers who own or lease any first ICE vehicle which is in a same vehicle class as a target BEV and a set of drivers who currently own or lease any target BEV;
    training a second ML model using the second dataset with their respective driving factors, wherein a first portion of the second dataset is used as a first training set and a second portion of the second dataset is used a first testing set;
    identifying, using the second ML model, a second set of prospective purchasers of BEVs from the set of drivers of the second dataset who own or lease any first ICE vehicle which is in the same vehicle class as the target BEV;

retraining the second ML using a confusion matrix as a second training set, wherein the confusion matrix is of actual versus predicted first ICE vehicle versus target BEV; and identifying a target set of prospective purchasers of BEVs based on the first set of prospective purchasers of BEVs and the second set of prospective purchasers of BEVs.

2. The computer-implemented method for identifying prospective purchasers of battery electric vehicles (BEVs) of claim 1, wherein identifying the target set of prospective purchasers of BEVs is based on an intersection of the first set of prospective purchasers of BEVs and the second set of prospective purchasers of BEVs.

3. The computer-implemented method for identifying prospective purchasers of battery electric vehicles (BEVs) of claim 1, wherein the first set of driving factors includes electronic customer relationship management (eCRM) information.

4. The computer-implemented method for identifying prospective purchasers of battery electric vehicles (BEVs) of claim 1, wherein the first set of driving factors includes trip behavior data.

5. The computer-implemented method for identifying prospective purchasers of battery electric vehicles (BEVs) of claim 1, wherein the first set of driving factors includes one or more of a user's typical navigation path's proximity to the charging station, an average travel velocity, an average mileage per day or per trip, a dwell time, a number of trips per month, a daily average mileage, a number of routine trips, a trip mileage score, a number of drives per day, a non-routine trip mileage, an average daily duration or time for driving, a number of non-routine weekday trips, a routine mileage score, a number of non-routine weekend trips, a number of non-routine trips, a routine trip mileage, a number of routine weekend trips, or a number of trips.

6. The computer-implemented method for identifying prospective purchasers of battery electric vehicles (BEVs) of claim 1, wherein the user's proximity to the charging station and the user's typical navigation path's proximity to the charging station are weighted more than one or more of the other driving factors from the first set of driving factors.

7. The computer-implemented method for identifying prospective purchasers of battery electric vehicles (BEVs) of claim 1, comprising tuning the first model or the second model based on random decision forests.

8. The computer-implemented method for identifying prospective purchasers of battery electric vehicles (BEVs) of claim 1, wherein the vehicle class is mid-size or compact.

9. The computer-implemented method for identifying prospective purchasers of battery electric vehicles (BEVs) of claim 1, wherein identifying the target set of prospective purchasers of BEVs is based on evaluation of a first model associated with the first dataset or evaluation of a second model associated with the second dataset using a confusion matrix.

10. A computer-implemented method for identifying prospective purchasers of battery electric vehicles (BEVs), comprising:

defining a predetermined time frame associated with vehicle ownership;

receiving a first dataset including a first set of driving factors, the first dataset including a first subset of drivers, a second subset of drivers, and a third subset of drivers, wherein the first dataset does not include actual BEV user data, wherein the first subset of drivers are drivers who have owned or leased any first internal combustion engine (ICE) vehicle followed by any second ICE vehicle within the predetermined time frame, wherein the second subset of drivers are drivers who have owned or leased any first ICE vehicle followed by any second BEV within the predetermined time frame, and wherein the third subset of drivers are drivers who have not changed vehicles within the predetermined time frame;

training a first machine-learning (ML) model using the first subset of drivers and the second subset of drivers with their respective driving factors, wherein a first portion of the subset of drivers is used as a first training set and a second portion of the subset of drivers is used a first testing set;

identifying, using the first trained ML model, a first set of prospective purchasers of BEVs from the third subset of drivers of the first dataset based on the first set of driving factors including a user's proximity to a charging station;

receiving a second dataset including a second set of driving factors, the second dataset including a set of drivers who own or lease any first ICE vehicle which is in a same vehicle class as a target BEV and a set of drivers who currently own or lease any target BEV;

training a second ML model using the second dataset with their respective driving factors, wherein a first portion of the second dataset is used as a first training set and a second portion of the second dataset is used a first testing set;

identifying, using the second ML model, a second set of prospective purchasers of BEVs from the set of drivers of the second dataset who own or lease any first ICE vehicle which is in the same vehicle class as the target BEV;

retraining the second ML using a confusion matrix as a second training set, wherein the confusion matrix is of actual versus predicted first ICE vehicle versus target BEV; and identifying a target set of prospective purchasers of BEVs based on the first set of prospective purchasers of BEVs and the second set of prospective purchasers of BEVs; and notifying one or more of the target set of prospective purchasers of BEVs of an incentive to purchase the target BEV.

11. The computer-implemented method for identifying prospective purchasers of battery electric vehicles (BEVs) of claim 10, wherein identifying the target set of prospective purchasers of BEVs is based on an intersection of the first set of prospective purchasers of BEVs and the second set of prospective purchasers of BEVs.

12. The computer-implemented method for identifying prospective purchasers of battery electric vehicles (BEVs) of claim 10, wherein the first set of driving factors includes electronic customer relationship management (eCRM) information.

13. The computer-implemented method for identifying prospective purchasers of battery electric vehicles (BEVs) of claim 10, wherein the first set of driving factors includes trip behavior data.

14. The computer-implemented method for identifying prospective purchasers of battery electric vehicles (BEVs) of claim 10, wherein the first set of driving factors includes one or more of a user's typical navigation path's proximity to the charging station, an average travel velocity, an average mileage per day or per trip, a dwell time, a number of trips per month, a daily average mileage, a number of routine trips, a trip mileage score, a number of drives per day, a non-routine trip mileage, an average daily duration or time for driving, a number of non-routine weekday trips, a routine mileage score, a number of non-routine weekend trips, a number of non-routine trips, a routine trip mileage, a number of routine weekend trips, or a number of trips.

15. The computer-implemented method for identifying prospective purchasers of battery electric vehicles (BEVs) of claim 14, wherein the user's proximity to the charging station and the user's typical navigation path's proximity to the charging station are weighted more than one or more of the other driving factors from the first set of driving factors.

16. A non-transitory computer readable storage medium storing instructions that when executed by a computer including a processor, perform a method, the method comprising:
 defining a predetermined time frame associated with vehicle ownership;
 receiving a first dataset including a first set of driving factors, the first dataset including a first subset of drivers, a second subset of drivers, and a third subset of drivers, wherein the first dataset does not include actual BEV user data,
 wherein the first subset of drivers are drivers who have owned or leased any first internal combustion engine (ICE) vehicle followed by any second ICE vehicle within the predetermined time frame,
 wherein the second subset of drivers are drivers who have owned or leased any first ICE vehicle followed by any second BEV within the predetermined time frame, and
 wherein the third subset of drivers are drivers who have not changed vehicles within the predetermined time frame;
 training a first machine-learning (ML) model using the first subset of drivers and the second subset of drivers with their respective driving factors, wherein a first portion of the subset of drivers is used as a first training set
 and a second portion of the subset of drivers is used a first testing set;
 identifying, using the first trained ML model, a first set of prospective purchasers of BEVs from the third subset of drivers of the first dataset based on the first set of driving factors including a user's proximity to a charging station;
 receiving a second dataset including a second set of driving factors, the second dataset including a set of drivers who own or lease any first ICE vehicle which is in a same vehicle class as a target BEV and a set of drivers who currently own or lease any target BEV;
 training a second ML model using the second dataset with their respective driving factors, wherein a first portion of the second dataset is used as a first training set
 and a second portion of the second dataset is used a first testing set;
 identifying, using the second ML model, a second set of prospective purchasers of BEVs from the set of drivers of the second dataset who own or lease any first ICE vehicle which is in the same vehicle class as the target BEV;
 retraining the second ML using a confusion matrix as a second training set, wherein the confusion matrix is of actual versus predicted first ICE vehicle versus target BEV; and
 identifying a target set of prospective purchasers of BEVs based on the first set of prospective purchasers of BEVs and the second set of prospective purchasers of BEVs; and
 notifying one or more of the target set of prospective purchasers of BEVs of an incentive to purchase the target BEV.

17. The non-transitory computer readable storage medium of claim 16, wherein identifying the target set of prospective purchasers of BEVs is based on an intersection of the first set of prospective purchasers of BEVs and the second set of prospective purchasers of BEVs.

18. The non-transitory computer readable storage medium of claim 16, wherein the first set of driving factors includes one or more of a user's typical navigation path's proximity to the charging station, an average travel velocity, an average mileage per day or per trip, a dwell time, a number of trips per month, a daily average mileage, a number of routine trips, a trip mileage score, a number of drives per day, a non-routine trip mileage, an average daily duration or time for driving, a number of non-routine weekday trips, a routine mileage score, a number of non-routine weekend trips, a number of non-routine trips, a routine trip mileage, a number of routine weekend trips, or a number of trips.

19. The non-transitory computer readable storage medium of claim 18, wherein the user's proximity to the charging station and the user's typical navigation path's proximity to the charging station are weighted more than one or more of the other driving factors from the first set of driving factors.

* * * * *